Sept. 24, 1968   R. J. MacDONALD ET AL   3,403,010
MULTILAYER BEARING HAVING A BASE OF STEEL AND
A SURFACE LAYER OF A LEAD ALLOY
Filed Feb. 14, 1966
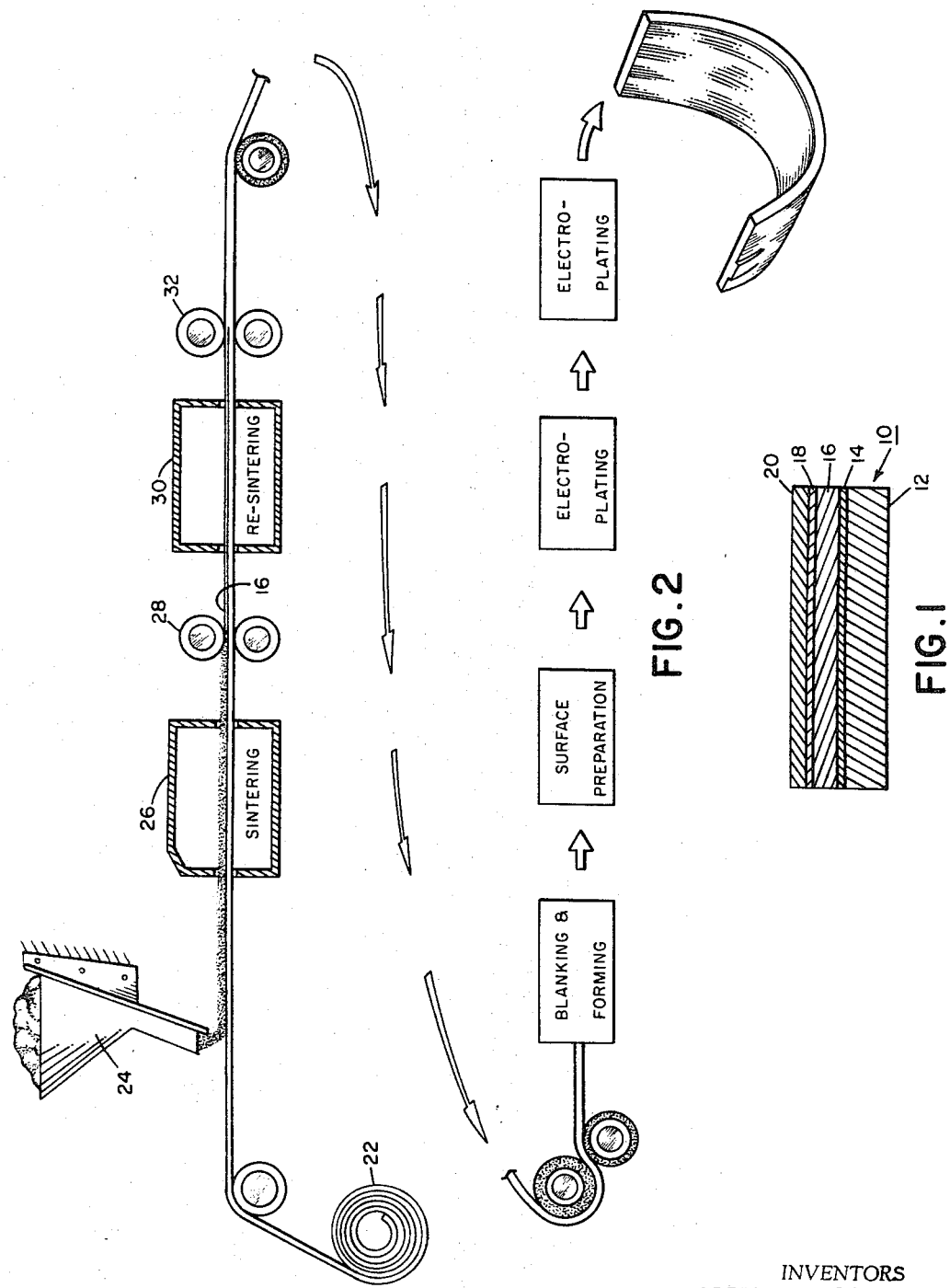
INVENTORS
ROBERT J. MacDONALD
JAMES F. WARD
*Edward S. Sachs*
ATTORNEY

United States Patent Office 3,403,010
Patented Sept. 24, 1968

3,403,010
MULTILAYER BEARING HAVING A BASE OF STEEL AND A SURFACE LAYER OF A LEAD ALLOY
Robert J. MacDonald, Moreland Hills, and James F. Ward, Cleveland, Ohio, assignors to Clevite Corporation, a corporation of Ohio
Filed Feb. 14, 1966, Ser. No. 527,130
8 Claims. (Cl. 29—183.5)

ABSTRACT OF THE DISCLOSURE

A multilayer bearing comprising a steel backing member bonded to a surface layer of lead alloy containing tin and copper through means of intermediate layers. One of the intermediate layers is composed of silver or copper and a minor amount of lead oxide or silicon oxide.

---

This invention relates generally to an improved bearing and more particularly to a bearing having a surface layer of relatively corrosion resistant material and an intermediate layer providing high fatigue strength.

The bearing herein under consideration is adapted to be employed for use in applications where high load and/or corrosion conditions are normally encountered. In bearings of this type it is generally required to provide a surface layer which has a fairly high lead-tin content. A layer composed of such a material will inhibit corrosion and aid in permitting the bearing surface to adjust to misalignment and shaft surface conditions. A variety of surface layer materials for such bearings are known. It has also been customary in the prior art to combine in such a bearing an intermediate layer of leaded-bronze or aluminum-tin alloys. The prime objective of such a layer has been to add fatigue resistance to the bearing member. However, experience has shown that leaded-bronze, while providing good fatigue resistance, is subject to attack by acid products found normally in lubricants which have deteriorated due to heat, oxidation, as well as moisture. The acidic contaminants also attack the lead phase of the leaded-bronze bearing surface after the above mentioned surface layer, or overlay, has been worn away. The removal of the lead phase weakens the bearing structure and accelerates its failure. The tendency for seizure increases in almost direct proportion as the lead is removed by the forces of corrosion. While an intermediate layer composed of aluminum alloys and including, for example, 5 to 7 weight percent tin, exhibits good corrosion resistance, the generally poor fatigue resistance of this material limits its use in any high load application.

The bearing in accordance with this invention avoids these disadvantages by establishing a strong substrate to provide high fatigue strength and corrosion resistance while allowing a sufficient degree of conformability to adjust to misalignment conditions that may occur during the life of the bearing. The advance in this art has been made possible by creating a substrate which provides the required properties and by placing the same into a compatible environment.

The invention takes advantage of several properties of lead silicate to produce an intermediate layer with good fatigue and corrosion resistance. These properties are embodied in a composition which is predominantly composed of copper or silver and includes a lead oxide base additive containing a certain percentage of silicon oxide. While this composition, per se, is not new, it has been found that suitable bearings for high load conditions could not be achieved without overcoming innumerable problems which stood in the way of providing a coherent bearing structure exhibiting all of these advantages of the individual materials. The difficulties encountered in providing such a coherent structure will be pointed out in more detail in order to facilitate a better understanding of applicants' invention and contribution.

A metallurgical system of predominantly copper or silver and a lead oxide base additive does not provide sufficient strength of the degree normally required for high load bearings. Such a composition will, normally, develop fatigue cracks when operated at 10,000 p.s.i. in the Underwood Fatigue Test. It will of course be appreciated that strengthening mechanisms for such metallurgical systems are very limited. It has been found that neither solid solution hardening nor heat treatment is desirable because of thermodynamic instability of the lead silicate phase at the sintering temperature. Also, normal hardening constituents for copper, such as tin, zinc, and nickel may not be used inasmuch as such material change the free energy relationships between the copper and the lead silicate resulting in the conversion of the latter to lead. Such conversion is undesirable as the lead silicate provides the bearing with self-lubricating qualities. In accordance with this invention it has now been found, that when an intermediate layer of such material is strain hardened the structural characteristics of the layer may be appreciably improved and the problems associated with fatigue and cracking avoided.

It is therefore the primary object of the invention to provide a multilayer bearing for high load applications which has improved fatigue resistance, conformability and embedability and is substantially impervious to attack by corrosion agents normally found in deteriorated lubricants, and includes an intermediate layer which is adapted to coat or establish a film of lubricant upon the shaft surface and to enhance the wetability of the oil to which the bearing is normally exposed.

It is a further object of this invention to provide a bearing material having high corrosion resistance, but normally insufficient fatigue strength, for high load bearing use and to make such material metallurgically compatible with the surface layer of the bearing.

One aspect of the present invention resides in providing a multilayer bearing which includes a steel backing member coated, by electro-deposition, with a relatively thin layer of copper. Superimposed upon the copper plated member is a composite layer of strain hardened material the base of which is selected from a group of metals which consist of copper and silver. Added to this base material is a pulverized mixture of lead oxide and silicon oxide (lead silicate). A relatively thin barrier layer resistant to tin diffusion is electro-deposited upon the composite layer to prevent any diffusion of tin from the surface layer. The surface layer, aside from the tin already mentioned, contains a small percentage of copper and the balance is substantially all lead.

For a better understanding of the present invention, together with other and further objects thereof, reference is had to the following description taken in connection with the accompanying drawings, and its scope will be pointed out in the appended claims.

In the drawings:
FIG. 1 is a cross sectional view of a typical bearing made in accordance with this invention; and
FIG. 2 is a diagrammatic illustration of the method for producing the bearing.

Turning now to FIG. 1 there is shown a multi-layer bearing structure 10 composed of a conventional steel backing member 12 coated with a thin layer of copper 14. The copper layer 14 has a thickness between .0002 and .0006 inch. The selection of the thickness depends in part upon the particle size and metallurgical characteristics of the succeeding layer and more particularly, as hereinafter discussed the lead silicate particles contained therein. It has been found that through proper selection and control of the size and amount of the lead silicate, the thickness of the copper layer can be held down to the .0002 inch minimum. The term lead silicate denotes a system of lead oxide and silicon oxide. Generally, it may be said that a copper layer thinner than the .0002 inch results in a sharply reduced bond.

In order to provide the bearing with good corrosion resistance as well as good fatigue resistance, there is provided an intermediate layer 16 composed of a matrix material of either copper or silver. The copper or silver is provided in the form of powder particles which are sintered together with powder particles of a lead oxide and silicon oxide additive. It should be noted that the presence of the lead oxide phase is imperative in order to provide the bearing with self-lubricating characteristics. Numerous metallurgical products have the tendency to reduce lead oxide to lead during sintering. It is therefore necessary that said additive materials be blended only with powder particles of a material whose free energy of oxide formation is more positive than lead oxide, or utilized in a system which inherently protects the lead oxide phase. The composite layer 16 is, preferably, composed of 80 to 95 weight percent of the aforestated base material and the balance is formed of, essentially, lead oxide and silicon oxide. The amount of silicon oxide may be in the range of up to 40 weight percent of the additive material. The most suitable combination of base and oxide additive material is approximately 95 weight percent copper, the remaining 5% being constituted of 92% lead oxide and 8% silicon oxide. It should be reiterated at this point that the above mentioned .0002 inch layer of copper, see 14, is needed to prevent the lead silicate from reacting with the steel at the sintering temperatures to form lead and iron oxides which are detrimental to bond quality.

A layer 18 composed of a material resistant to tin diffusion is electro-deposited upon the intermediate layer 16. The layer 18 constitutes a barrier to tin and is formed of a metal, or metal alloy, such as nickel, iron, cadmium, zinc and cobalt. In the preferred embodiment the barrier layer 18 is composed of nickel and has a thickness approximately between .00005 and .001 inch.

Finally, the bearing is provided with a surface layer 20 which has qualities of high fatigue resistance and properties adapted for high surface speeds and loads. In the preferred embodiment the surface layer is composed of from 6 to 12% tin, 0.5% to 6% copper and the balance lead. The soft lead base permits the absorption of foreign particles from the oil environments and allows adjustment for slight misalignment between the bearing and the journal. The characteristic of embedability and corrosion resistance can only be retained as long as the tin is prevented from migrating towards the copper which is contained in layer 14 and for which it has a metallurgical affinity. It is for this reason that a barrier layer 18 must be interposed between layers 16 and 20.

Particularly useful bearing properties are obtained by forming the surface layer 20 with a 10% tin content and 3% copper with the balance substantially all lead. The thickness of layer 20 is approximately between 0.0005 and 0.004 inch.

Turning now to FIG. 2, there is shown a process diagram for producing the bearing above described. A steel strip 22 is coated, by electro-deposition, with a layer of copper and this strip is passed underneath a hopper 24 containing the powder particles of the intermediate layer 16 and deposits these particles upon the strip 22. With the powder blend spread upon the copper plated steel strip, the latter is passed through a sintering furnace 26 at 1500° F. To prevent oxidation of the copper or a reduction of the lead silicate, it is necessary to sinter in a dry, inert atmosphere. Pre-purified nitrogen has been used most successfully for this purpose. The strip is sintered at the peak temperature for approximately five minutes.

In order to avoid abrasion treatment of the copper plated strip prior to spreading the powder particles, it has been found that the time lag between the plating and sintering is critical. An excessive intervening time lapse will tend to discolor and tarnish the copper and detrimentally affect the bonding between the steel backing 12 and intermediate layer 16. The abrasion step can be eliminated if and when the strip is immediately used after plating and before such oxidation and tarnishing progress begins. Subsequent to sintering, the thickness of the strip is reduced by passing through a pair of cold rolls 28. The rolling step densifies the sintered layer with an approximate reduction of 65% in the thickness of layer 16 and about 5% in the thickness of the steel backing 12. After the rolling step is completed the strip is resintered in furnace 30 under the same conditions as outlined with respect to furnace 26.

As has already been alluded to in the introductory part of this specification, it has been vitally important to strengthen the copper-lead-silicate system in order to improve the hardness characteristics of the layer 16. Experiments have indicated that a hardening of the strip after resintering will appreciably improve such characteristics. The following Table I is indicative of the level of hardness that can be achieved under indicated conditions.

TABLE I.—STRAIN HARDENING

| Reduction of layers 12, 14 and 16 thickness, inch | Layer 12 hardness, $R_B$ [1] | Layer 16 hardness, BHN [2] |
|---|---|---|
| 0.080 | 57 | 58 |
| 0.079 | 58 | 63 |
| 0.078 | 64 | 69 |
| 0.077 | 66 | 78 |
| 0.0755 | 68 | 88 |
| 0.0725 | 71 | 91 |

[1] $R_B$—Rockwell hardness B scale.
[2] BHN—Brinell hardness number.

The strain hardening is accomplished by passing the strip through suitable rolls 32 at room temperature. In the preferred embodiment the strip is strain hardened to effect an increase in the hardness of the layer 16 to about 90 Brinell Hardness Number. This requires, approximately, a 25% reduction in the layer thickness.

The composite strip 22 is then cut and individual pieces are formed into suitable bearing shapes. The surface of the resulting bearing shape is freed of lead silicate particles. The removal of such particles can be accomplished by a variety of mechanisms. Initially, it should be noted that it is difficult, if not impossible, to obtain a suitable bond between the intermediate layer 16 and the surface layer 20 without removing such particles. Experiments have shown that the nonconducting lead silicate particles produce weakly adhering layers which have a tendency to crack and fail. Inasmuch as only the particles immediately at the surface need be removed it is possible to dissolve such lead silicate particles by exposure to ammonium acetate. A fairly good adherence between the layer 16 and the electro-deposited nickel can be obtained by such a process. For certain operations the time and temperature cycles required for such chemical removal are frequently undesirable. As an alternative, and under certain conditions, the surface of the bearing may be mechanically prepared, for instance machining with a diamond boring tool. With this method a very shallow depth of the lead silicate removal can be obtained. Vapor blasting can also be used to remove the lead silicate at the surface.

Each bearing is electroplated with current density of 20 amps per square foot for 6 minutes in a Watt's nickel bath. Thereafter the surface layer 20 is deposited by immersing the bearing in a lead-tin-copper fluoborate bath with current density of 20 amps per square foot for 12 minutes to provide a minimum thickness of 0.0005 inch.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A multilayer bearing comprising: a steel backing member coated with a layer of copper having a minimum thickness of not substantially less than 0.0002 inch; an intermediate layer bonded to the coated backing layer and composed of approximately 80 to 95 weight percent of a base material selected from a group of metals consisting of copper and silver, and the balance of an additive metal selected from a group consisting essentially of lead oxide and silicon oxide; and a relatively thin barrier layer on said intermediate layer of material resistant to tin diffusion and selected from a group of metals consisting essentially of nickel, iron, cadmium, zinc and cobalt or a combination thereof; and a surface layer bonded to the barrier layer composed predominantly of lead and the balance comprising tin and copper.

2. A multilayer bearing according to claim 1, wherein said copper layer is electro-deposited upon said backing member and has a thickness of less than .0006 inch.

3. A multilayer bearing according to claim 2, wherein said copper layer has a thickness ranging between .0002 and .0006 inch.

4. A multilayer bearing according to claim 1, wherein said surface layer contains approximately 10% tin, 3% copper and the balance substantially all lead.

5. A multilayer bearing according to claim 4, wherein said surface layer has a thickness between .0003 and .002 inch.

6. A multilayer bearing according to claim 1, wherein the additive materials of said intermediate layer consists essentially of 0 to 40 weight percent silicon oxide and the balance lead oxide.

7. A multilayer bearing according to claim 1, wherein said intermediate layer has a thickness between .002 and 0.100 inch.

8. A multilayer bearing accroding to claim 6, wherein said additives are composed of approximately 92 weight percent lead oxide and 8 percent silicon oxide.

References Cited

UNITED STATES PATENTS

| | | | |
|---|---|---|---|
| 2,459,172 | 1/1949 | Luetkemeyer | 20—196.3 |
| 2,635,020 | 4/1953 | Beebe | 29—196.3 |
| 2,970,933 | 2/1961 | Barera | 29—196.3 XR |
| 2,977,673 | 4/1961 | Weinman | 29—196.3 |

HYLAND BIZOT, *Primary Examiner.*